May 3, 1938.  G. MALMGREN  2,116,120
BORE HOLE SURVEYING APPARATUS AND METHOD
Filed Dec. 21, 1934  2 Sheets-Sheet 1

INVENTOR.
GEORGE MALMGREN.
BY Lippincott & Metcalf
his ATTORNEYS.

May 3, 1938.  G. MALMGREN  2,116,120
BORE HOLE SURVEYING APPARATUS AND METHOD
Filed Dec. 21, 1934   2 Sheets-Sheet 2

INVENTOR,
GEORGE MALMGREN.
BY Lippincott & Metcalf
his ATTORNEYS.

Patented May 3, 1938

2,116,120

UNITED STATES PATENT OFFICE 2,116,120

BORE HOLE SURVEYING APPARATUS AND METHOD

George Malmgren, San Francisco, Calif.

Application December 21, 1934, Serial No. 758,621

5 Claims. (Cl. 33—205.5)

My invention relates to an apparatus and method adapted for the surveying of bore holes and more particularly for determining the angular deviation from the earth's perpendicular, together with the direction of deviation, in bore holes as particularly exemplified by oil wells.

Among the objects of my invention are: To provide an accurate bore hole surveying apparatus; to provide bore hole surveying apparatus which will determine the inclination and direction of inclination at various depths of a bore hole; to provide a bore hole surveying apparatus which is not affected by the earth's magnetism; to provide a bore hole surveying device giving a continuous record; to provide a bore hole surveying apparatus giving a polar coordinate record; and to provide a bore hole surveying apparatus giving a true survey of bore hole inclination.

Other objects of my invention will be apparent or will be specifically pointed out in the description forming a part of this specification, but I do not limit myself to the embodiment of the invention herein described, as various forms may be adopted within the scope of the claims.

In the drawings, Figure 1 is a longitudinal view partly in section and partly in elevation of a preferred embodiment of the survey apparatus of my invention.

Figure 1:
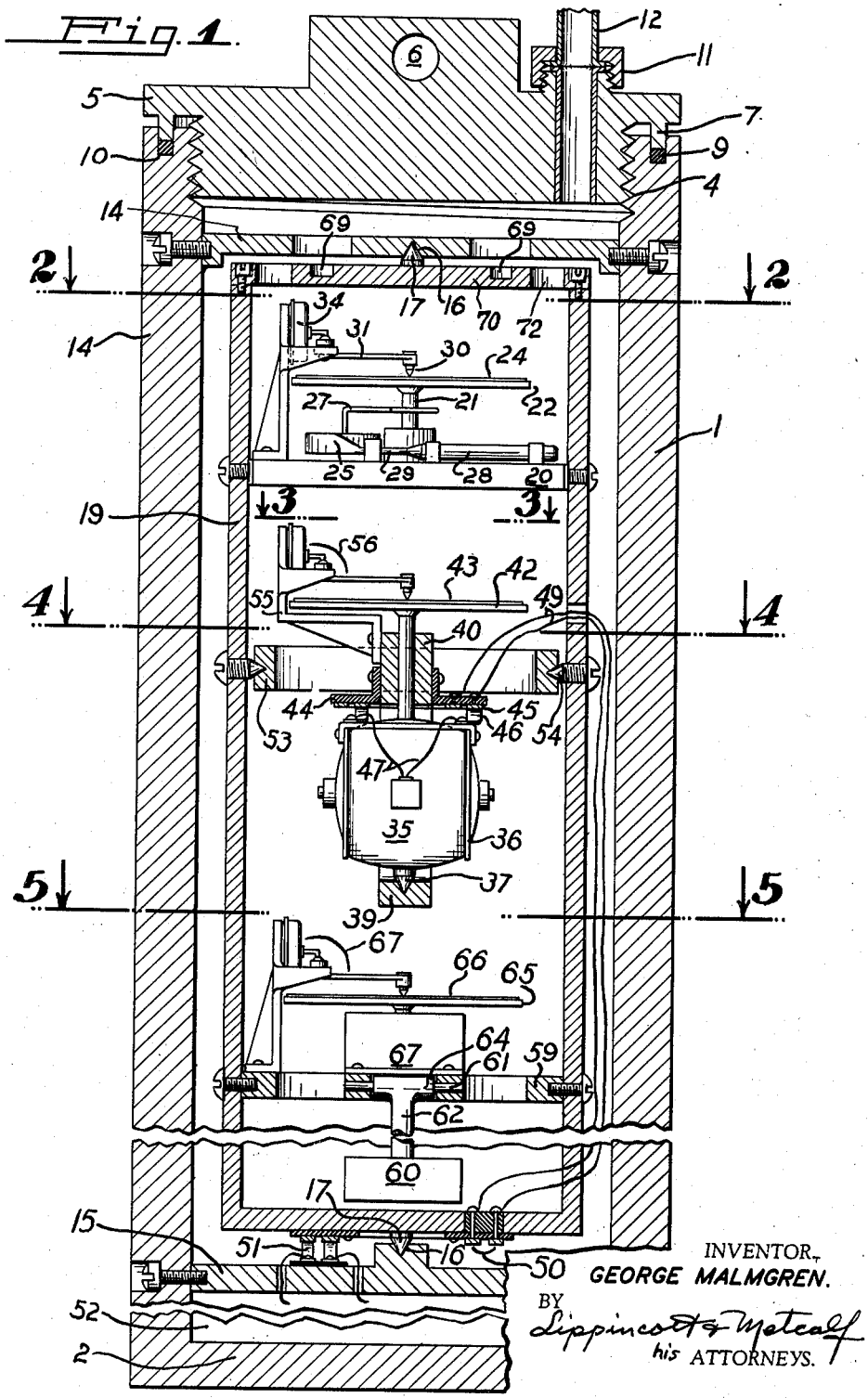
Figure 2:
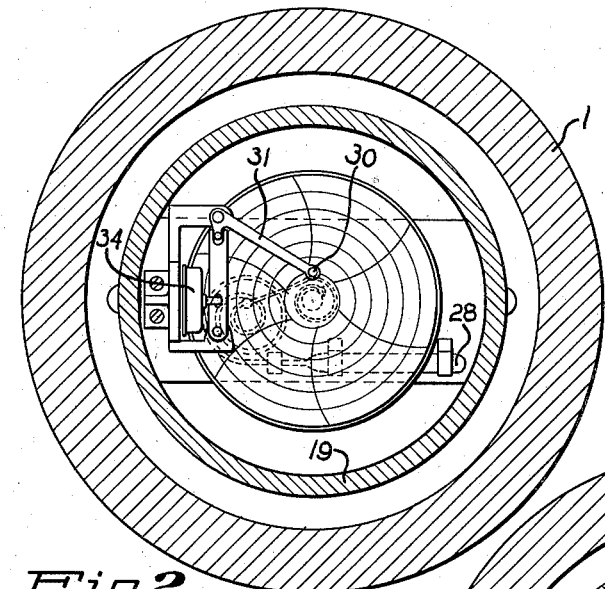
Figure 2 is a view partly in section and partly in elevation, taken through the plane indicated by the lines 2—2 of Figure 1.
Figure 3:
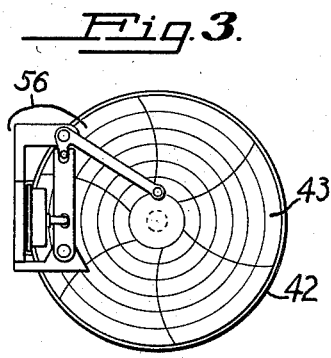
Figure 3 is a plan view of a chart taken as indicated by line 3—3 in Figure 1.
Figure 4:
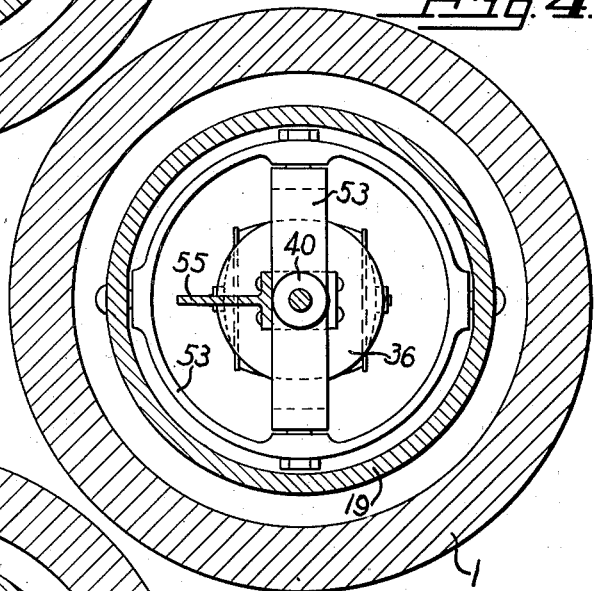
Figure 4 is a view partly in section and partly in elevation taken through the plane indicated by the lines 4—4 in Figure 1.
Figure 5:
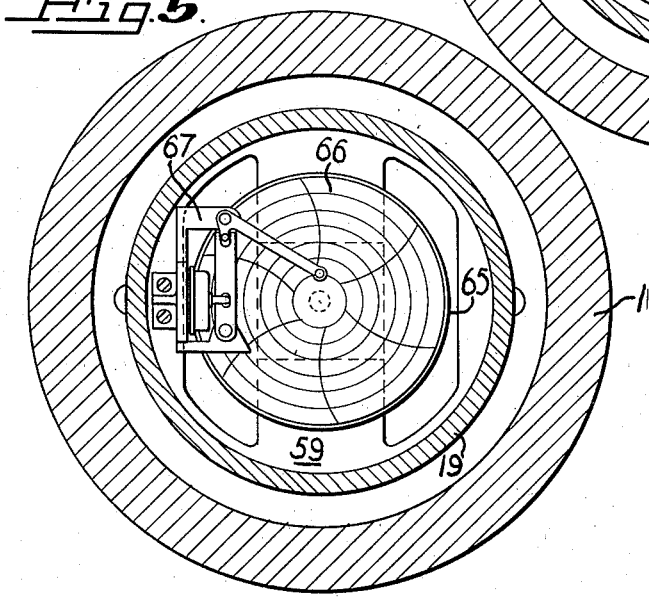
Figure 5 is a view partly in elevation and partly in section taken through the plane indicated by the lines 5—5 in Figure 1.

All figures are diagrammatic for ease of illustration.

Referring directly to the drawings for a detailed description of the preferred embodiment of my invention, as shown, a substantial cylindrical casing 1, preferably seamless, is provided with a closed end wall 2, the opposite end, which in service is the upper end, being provided with threads 4 adapted to receive a screw cap 5. This screw cap is provided with a cable attachment aperture 6 and also with a sealing flange 7, which bears against a lead gasket 9 inserted in a gasket groove 10 in the cylinder wall. For shallow well surveys I also prefer to perforate the cap and attach thereto by means of a coupling 11 a seamless steel tubing 12 for purposes later to be explained.

The interior of the cylinder is provided with an upper shelf 14 and a lower shelf 15, each provided with central bearings 16, preferably cone shaped, in which are inserted inner case pivots 17. These pivots are preferably of hardened material, and are the sole support of an inner case 19, which carries the various instruments and is freely revolvable within the main casing 1. I prefer to mount a number of instruments within the casing and while I will describe them as being in a particular order from top to bottom, it is to be understood that this order is of no particular advantage and they may be arranged in different relative positions if it appears desirable.

Beginning, then, in the upper part of the inner casing, I prefer to mount on an upper instrument shelf 20 a depth correction chart table 22, upon which is mounted depth correction chart 24. The table 22 with its chart, is rotated by means of a Bourdon tube 25 connected to a correction chart shaft 26 by an operating link 27. The Bourdon tube is actuated by pressure changes due to temperature changes around and within a thermometer bulb 28 connected with the Bourdon tube by a capillary tube 29. The shaft 26 will then be rotated by an amount determined by the temperature change to which the thermometer bulb assembly 28—29—27 is exposed. Contacting the chart with its zero position near the axis of the chart is a correction chart ink syphon or stylus 30 which is adapted to be moved in a curved path over the chart passing through the central portion of the chart by means of an aneroid stylus arm 31 operated through an aneroid link 32 which in turn is connected to an aneroid chamber 34 of the usual type. Thus, in the cooperation of the two movements, the arm 31 is moved outwardly and away from the center of the depth correction chart in accordance with the varying pressure affecting the aneroid, and the chart itself will be rotated in accordance with temperature by the thermometer assembly, and a permanent two dimensional record will be made on the chart of the combined movements. This record is in polar coordinates and records pressure as the angle of a radius vector and temperature as the magnitude of that vector.

Immediately below the depth correction assembly I prefer to mount a gyroscopic compass assembly. This assembly comprises a gyroscopic motor 35 which is preferably a motor having a well balanced and relatively heavy armature rotating in a motor frame 36. The motor frame is rotatable around the horizontal axis of the inner case, a motor case pivot 37 entering a bearing band 39 attached to a motor case bearing block 40. The motor case is also provided with a case extension shaft 41 passing through the center of the bearing block 40, carrying on its upper end a compass table 42 having fixed thereon a compass chart 43. Bearing block 40 also carries an insulated disc 44 upon which slip rings 45 are mounted, contacted by brushes 46 attached to the motor case and connected by leads 47 to the motor. The slip rings 45 are provided with flexible leads 49 which in turn run along the side of the inner casing 19 to the lower wall thereof which is provided with casing slip rings 50 connected to casing brushes 51, which are energized by a battery, not shown, in a battery chamber 52 in the lower end of the main casing.

The bearing block 40 is mounted on gymbals 53 rotatable within the case on gymbal pivots 54 fastened to the side walls of the inner case. The gyroscopic motor, therefore, may assume an upright position within the case irrespective of the inclination of the casing.

Mounted on the bearing block 40 by means of an angle arm 55 is an aneroid assembly 56 similar in all respects to that described for operation in conjunction with depth correction chart 24 and having its stylus positioned to mark the chart. The operation of the compass will be given later in describing the overall operation of the device.

Just below the compass assembly I prefer to mount an inclination recorder assembly on an inclination shelf 59. This assembly comprises a fairly heavy pendulum weight 60 connected to a bearing pin 61 by a pendulum rod 62 so that when the casing is perpendicular the pendulum will lie in the central axis of the casing, and will be free to swing in one plane only as determined by the position of the pendulum pin 61. The pendulum is then connected by a gear sector 64, only a part of which is shown, to an inclination chart table 65 upon which is mounted an inclination chart 66, through a gear box 67 in which I prefer in any well known manner to step up the motion of the pendulum 36–1 in order that the movements of the pendulum be greatly magnified on the chart 66. The polar coordinate record on the chart 66 is made by an aneroid assembly 67 similar in all respects to the other aneroid assemblies previously referred to with its recording stylus contacting the chart. Thus it can be seen, that all of the three charts will have upon them polar coordinate records, and that all the records will be continuous and will have pressure as one coordinate.

In setting up the instrument for use, I prefer to hold the casing 1 in upright position over the bore hole to be surveyed, with the cap 5 removed.

I also prefer to remove upper shelf 14 and to provide the inner case with a removable top 70 through which entrance to the inner casing may be had. The various units therein are removable by removing their respective wall screws. The units may then be raised one by one through the top of the case, checked, their charts removed and changed, and the units replaced.

It is also within the scope or knowledge of those skilled in the art that apertures may be provided in the inner case side walls so that charts may be removed and replaced without withdrawing the units.

After the charts have been placed upon the tables and the units secured in their proper locations, inner casing 19 is lowered into the main casing 1 until lower pivot 17 is immediately over lower bearing 16, but not sufficiently close to cause brushes 51 to come in contact with rings 50. Top plate 70 may then be screwed in place.

The next step is the orienting of the gyroscope and the pendulum. To orient these devices I prefer to set up by transit a stake placed well away from the bore hole so that the segment between the stake and the bore hole axis has the bearing north zero degrees east. Any convenient form of sight may then be dropped into the sight holes 69 and the inner case rotated by sighting on the stake until pendulum 60 swings in the meridian plane. Inasmuch as the pendulum is preferably placed at the bottom of the inner case, marks denoting the plane of the pendulum swing may be conveniently placed on the top of the inner case to facilitate sighting.

After the inner case is properly oriented, it is necessary to orient the compass chart. This may be done in any manner obvious to those skilled in the art but may be conveniently accomplished by inserting a tool or wire through hole 72 in top plate 70 past chart table 22 until the end of this tool contacts chart table 42. By means of this tool the motor chart table is rotated so that the tangent at the center of the chart to the circular line having the boring north zero degrees east is also in the meridian plane; and, for ease of sighting, chart table 42 may have thereupon an index mark adapted to cooperate with another mark on the inner casing.

After the motor table and casing have been oriented, the entire inner casing is lowered a short distance until pivot 17 enters bearing 16, and brush 51 contacts rings 50, thus starting the motor. It is preferable to have the chart table 42 and chart so connected to the motor that when the motor table is properly oriented the plane of the fly wheel or the armature of the motor now acting as a gyroscope is also in the meridian plane. As is well known, under these circumstances, the gyroscope acts as a true geographic compass and will, providing it is properly mounted and unrestrained, remain in the meridian plane thereafter. In this case, irrespective of the rotation or inclination of either of the casings, the motor will maintain itself with its armature rotating in the meridian plane and thus will turn relative to the stylus and record upon the chart 43 the turning of the casing 19 together with the depth indication as created by the aneroid assembly 56, causing the outward movement of the stylus.

After the gyroscope, as the motor may be termed, has been set with the rotating element in the meridian plane and the inner casing set so that the pendulum swings in the same plane. Upper shelf 14 is then placed in the outer casing with upper pivot 17 engaging upper bearing 16, thus making casing 19 freely rotatable, the cap 5 is screwed on tightly and the hollow seamless tubing 12 is attached to the cap. A cable is then attached to the eyelet 6 and the entire casing 1 lowered into the bore hole unreeling not only the cable but also the seamless tubing 12, the surface end of which is open to the atmosphere in order that the weight of the air column, due to the depth of the instrument may act upon the aneroids 34, 56 and 67, all of which have had their styluses set at a zero point on the inner portion of the charts.

While I have described my device as equipped for shallow well measurements, it is obvious that for deep well measurements cap 5 may have substituted therefor the lower end of a dry drill pipe string. The use of dry drill pipe is well known in the art, and venting of the main casing to the outer atmosphere will take place through the bore of the drill pipe, which may be run dry and empty to considerable depths, even in wells filled with mud and water.

As the case descends, a continuous polar coordinate record will be made on all three charts 24, 43 and 66. Let us assume, for example, that after the casing has been lowered a certain amount that an inclination of the bore hole occurs. If such does happen, pendulum 60 swings away from the vertical axis of the device, thus giving the inner casing 19 a heavy side moment which tends to and does rotate the inner case 19 on its pivots 17. Inclination will be recorded on chart 66 as the chart will be turned by the gears attached to the pendulum and the polar coordinate traced. The angle of rotation of case 19 will be shown on chart 43, because when the case 19 is rotated due to the action of the pendulum creating a heavy side and consequent rotation, the gyroscope will maintain its position thus causing chart 43 to rotate with relation to the operating pen or stylus contacting therewith. Should another change in inclination take place, as the casing proceeds on its downward journey, the inner casing 19 will be rotated still again, recording the change both in inclination on the chart 66 and in azimuth angle on the chart 43.

All the while the casing is being lowered, the air pressure is increasing and the respective aneroid styluses are being moved toward the periphery of the charts, giving on the trace of each chart an uncorrected depth coordinate in addition to their inclination, direction of inclination, and temperature coordinates.

When the entire instrument reaches the bottom of the hole, the length of cable reeled out is read on a suitable instrument to give the total depth reading and thereafter by correction from the depth correction chart, the exact depth can be obtained of any intermediate point as indicated by the intermediate readings of all the aneroids.

It will thus be seen that I am able by the use of my invention to obtain a bore hole survey which is continuous from top to bottom of the hole and which may be corrected for any intermediate depth. The importance of such a continuous record is obvious.

When any surveying instrument is lowered into a bore hole, and which is so constructed as to record inclination and direction intermittently, or where a single record is taken at the bottom of the hole, data obtained from such intermittent or single records is almost invariably entirely misleading, as the records do not tell the average angle of the hole nor do they in any way give a clue to the actual distance of the bottom of the bore hole from the perpendicular passing through the bore hole opening. An exaggerated example of this would be a case where a bore hole surveying instrument is lowered into a hole, this instrument making a reading every hundred feet. If we could consider an example where all the inclinations took place in the hundred feet between readings and the places where the readings took place were vertical, we would get from that crooked hole a complete record indicating a perfectly straight hole. The bottom of the hole, however, would be at a distance away from the vertical which would be dependent upon the angle of inclination of the hole as occurring between readings. Likewise, in a similar case, such intermittent records could be procured showing a uniform angle of inclination at each reading and yet there might be a greater angle or a lesser angle between readings so that when the entire set of intermittent readings was obtained the picture or graph drawn of the hole, using the readings as a plotting basis, would give an absolutely and entirely erroneous picture of the actual inclination of the hole. In the device, however, which I have just described, a continuous reading is obtained. Any minute or temporary inclinations which tend to throw the bottom of the hole away from or toward the perpendicular are all of record and thus by a continuous plotting starting at the top, the actual and complete inclination of the hole can be obtained and when the projected graph of the hole is made, it can be immediately calculated therefrom what the actual distance the bottom of the hole is from the vertical, and the azimuth of the line connecting the projected top of the hole with the projected bottom of the same hole, can be ascertained.

My instrument is ideally adapted for deep wells, as well as relatively shallow ones, because depth has no influence whatever upon the recorded inclination. The increased air pressure due to depth has no noticeable effect on the recorded temperatures as the pressure increase could not possibly compress the mercury with which bulb 28, capillary tube 29, and Bourdon tube 25 are filled. The increased air pressure will cause the aneroids to record which, of course, is the purpose of the aneroids. The recorded pressure, along with the accurate measurement of the length of pipe or cable used to reach the desired depth, and the temperature recorded at that depth, is accurately translated into feet depth. The only inaccuracy which may be found is one which is due to the fact that the error of the gyroscope increases with time. However, I have found that in modern well rigs, drill pipe may be made up sufficiently rapidly and lowering accomplished in either of the manners described in such a short time that this error may in most cases be entirely neglected. It is, however, possible to check this error and correct for it by test runs of the instrument under known conditions.

I have been able to make in practical form a device as described which has been used within a five and one-half inch casing and operative under any and all conditions so far encountered in oil wells. It should also be pointed out that the device is fully operative even though temperatures at relatively large depths are increased. It is true that the air contained within the instrument and the steel tubing 12, or in the case of deep wells dry drill pipe, is heated, but if the instrument were not lowered as the temperature was raised the actual pressure within the inner casing 19 would be reduced due to the fact that the specific gravity of the air column, the height of which would be constant, would decrease as the air expands. By lowering the instrument an air column constantly increasing in height is acting on the aneroids, and this height can be substantially and accurately determined from the pressure recorded by the aneroids, and the substantially accurate temperature recorded. As pointed out above, the increased air pressure within casing 19 does not at all affect a Bourdon tube filled with mercury, and will only slightly affect one filled with nitrogen at a pressure of two hundred to two hundred and fifty pounds per square inch, as are commonly used in recording thermometers. The records of the latter are accepted as substantially correct for all commercial purposes. Therefore, a substantially correct temperature is recorded which for all practical purposes can be used to correct the aneroid readings. Further, the aneroids are not used to determine the depth. The depth is accurately determined by measuring the cable or drill and pipe used to lower the instrument, and the aneroid readings are merely used to conveniently interpolate the intermediate depth where changes in bearing and inclination take place.

I claim:

1. In combination, bore hole survey apparatus comprising a cylindrical outer casing capable of being lowered into a bore hole, a concentric inner casing rotatable around an axis parallel to the axis of said bore hole, a compass mounted in said inner casing, a chart positioned by said compass, a recording stylus rotating with said inner casing and cooperating with said chart to record relative movement thereof, a pendulum mounted on said inner casing having its suspension crossing the axis of said cylinders and swingable in a single plane parallel to and including said axis, said pendulum being of sufficient weight to rotate said inner casing due to the shift of center of gravity thereof when said axis is inclined, said shift being the sole factor causing rotation of said inner casing, thereby recording direction of inclination.

2. In combination, bore hole survey apparatus comrising a cylindrical outer casing vented to atmosphere, means for lowering said casing into a bore hole meanwhile maintaining said vent, a concentric inner casing rotatable around an axis parallel to the axis of said bore hole, a compass mounted in said inner casing, a chart positioned by said compass, a recording stylus rotating with said inner casing and cooperating with said chart to record relative movement thereof, a pendulum mounted on said inner casing having its suspension crossing the axis of said cylinders and swingable in a single plane parallel to and including said axis, said pendulum being of sufficient weight to rotate said inner casing due to the shift of center of gravity thereof when said axis is inclined, said shift being the sole factor causing rotation of said inner casing, thereby recording direction of inclination, and means for modifying the relative movement of said compass and said stylus by a pressure factor.

3. In combination, bore hole survey apparatus comprising a cylindrical outer casing capable of being lowered into a bore hole, a concentric inner casing rotatable around an axis parallel to the axis of said bore hole, a compass mounted in said inner casing, a chart positioned by said compass, a recording stylus rotating with said inner casing and cooperating with said chart to record relative movement thereof, a pendulum mounted on said inner casing having its suspension crossing the axis of said cylinders and swingable in a single plane parallel to and including said axis, said pendulum being of sufficient weight to rotate said inner casing due to the shift of center of gravity thereof when said axis is inclined, said shift being the sole factor causing rotation of said inner casing, thereby recording direction of inclination, and additional means for recording the degree of pendulum swing in said plane.

4. In combination, bore hole survey apparatus comprising a cylindrical outer casing capable of being lowered into a bore hole, a concentric inner casing rotatable and balanced around an axis parallel to the axis of said bore hole, a compass mounted in said inner casing, a chart positioned by said compass, a recording stylus rotating with said inner casing and cooperating with said chart to record relative movement thereof, a weight mounted in said inner casing and free to move across the axis of said cylinder to change the center of gravity thereof, thereby causing rotation of said inner casing with respect to said chart and a record when said axis is inclined.

5. In combination, bore hole survey apparatus comprising a cylindrical outer casing capable of being lowered into a bore hole, a concentric inner casing rotatable and balanced around an axis parallel to the axis of said bore hole, a compass mounted in said inner casing, a chart positioned by said compass, a recording stylus rotating with said inner casing and cooperating with said chart to record relative movement thereof, a weight mounted in said inner casing and free to move across the axis of said cylinder to change the center of gravity thereof, thereby causing rotation of said inner casing with respect to said chart and a record when said axis is inclined, and means for modifying the record by a depth factor.

GEORGE MALMGREN.